No. 882,609. PATENTED MAR. 24, 1908.
F. H. AYER.
BONDING PIN.
APPLICATION FILED FEB. 23, 1907.
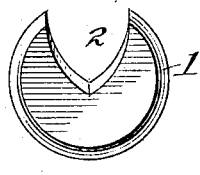
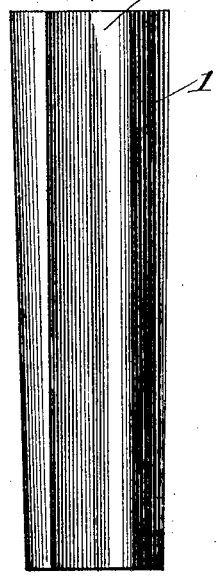
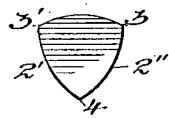
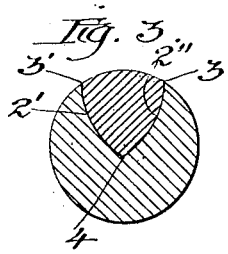
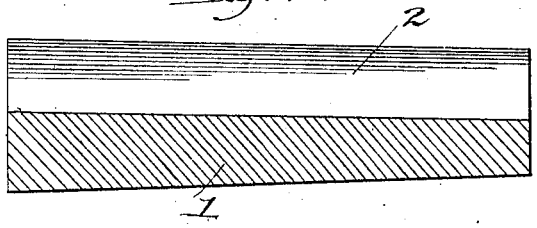
Witnesses:
Frank J. Blanchard
Emilie Rose
Inventor:
Frederick H. Ayer,
By Albert N. Graves,
Attorney.
THE NORRIS PETERS CO., WASHINGTON, D. C.

UNITED STATES PATENT OFFICE.

FREDERICK H. AYER, OF CHICAGO HEIGHTS, ILLINOIS.

BONDING-PIN.

No. 882,609.  Specification of Letters Patent.  Patented March 24, 1908.

Application filed February 23, 1907. Serial No. 358,781.

*To all whom it may concern:*

Be it known that I, FREDERICK H. AYER, a citizen of the United States, residing at Chicago Heights, in the county of Cook and State of Illinois, have invented certain new and useful Improvements in Bonding-Pins, of which the following is a specification.

This invention relates to improvements in bonding pins and refers more specifically to bonding pins of that type which are tapered and provided with a longitudinal channel within which the bonding wire rests when the pin has been driven into the rail or other member which is bonded.

One of the most important considerations involved in the making of bonding pins is that of securing a surface contact between the three members going to make up the union, viz: the bond, the bonding pin and the rail, as nearly perfect as possible. Perfection would, of course, be an integral union of these members at all points of contact, and next to this a theoretically ideal condition is a union which insures perfectly close metallic contact between all contiguous surfaces. The art is quite extensive and a large variety of bonding pins and connectors have been developed, some of which have attained a high degree of success.

The general type of bonding pin which has achieved greatest popularity is one which is tapering to such extent as to secure a wedging action when driven into the rail, and channeled throughout its length so that the bonding wire lies alongside of the bonding pin and partially embedded in the latter when the pin has been driven home. It is with a pin of this general type that the present invention is more specifically concerned.

It has been proposed to construct a bonding wire provided with specially formed terminal portions of a size to fit the holes in the ends of the rail and having sector-shaped grooves, into which wedges corresponding in cross sectional shape to the form of the grooves are to be driven alongside of said terminal portions. The terminal portions are furthermore each provided with an enlargement forming a shoulder to hold it from endwise movement while its wedge was being driven into place. Such a construction while theoretically efficient, does not meet the practical conditions sought to be provided for in the present invention, as will hereinafter appear.

The pin of the prior art which most closely approaches that of the present invention is a pin slightly tapered throughout its length and provided with a groove of approximately uniform depth extending throughout the length of the pin, at one side thereof; this groove or channel being semicircular in cross section. With such a pin it is customary to use a round bonding wire of such diameter that it will fit snugly within the groove or channel, but inasmuch as the channel is an open one and its width must be sufficient to permit the bonding wire to be laid therein, it follows that the walls of the channel initially fit only a part of the circumferential surface of the wire, and the swaging action incident to the driving of the tapered pin and contained wire into the rail must be depended upon for re-shaping the edges of the channel and the lateral outer side of the bonding wire sufficiently to make as nearly as practicable the close joint desired. In practice, intimate metallic contact between the three members along the edges of the channel throughout the length of that part of the pin inclosed within the rail when driven, is not secured. In other words, the swaging or re-forming action is only effective to a certain degree and more or less open joints exist at each side of the bonding wire along the edges of the channel.

The actual loss of metallic contact which initially exists by reason of such defective union is of small importance as compared with the after-results. That is to say, if any imperfection of joint whatever exists which permits access of the atmosphere and moisture, oxidation ensues and the conducting efficiency of the joint becomes rapidly impaired.

In carrying out my invention I utilize a suitably shaped pin which, when properly driven into the rail, will exactly fill and fit the aperture therein as to all of its parts, except of course the channel interruption, and in conjunction with such channel pin I use a rail bond wire of such cross sectional form that when laid within the channel it exactly fits and fills the latter, and as to its external side, exactly or substantially conforms to the external shape of the pin.

The invention will be more readily understood from a description of a specific embodiment thereof shown in the accompanying drawings, in which—

Figure 1 is an end elevation of the bonding pin, looking at the smaller end of the latter;

Fig. 2 is a side elevation of the pin viewing that side of the latter containing the channel; Fig. 3 is a cross sectional view of the pin with the bonding wire or rod assembled therein; Fig. 4 is a longitudinal sectional view taken through the pin on a radius which intersects the deepest part of the channel; Fig. 5 is an end elevation of the bonding wire used in conjunction with the pin; Fig. 6 is a side elevation of a fragmentary portion of such bonding wire.

In the preferred embodiment shown, the bonding pin 1 is externally slightly tapered throughout its length, and, except for its channel, is circular in cross section; being therefore of truncated-cone shape. The channel of the pin is preferably straight and of substantially uniform width and depth throughout the length of the pin.

Inasmuch as the matters of first cost and labor of assembling and applying the bonds are both of prime importance, I adopt a form of channel and corresponding form of bonding wire which may be made at minimum expense and applied with the expenditure of minimum time and expense, yet securing with certainty the characteristic joint desired. To this end I provide the channel pin with a channel, the two sides of which are formed on arcs respectively concentric with the lines of juncture of the channel sides with the outer approximately cylindric surface of the pin. That is to say, the side 2' of the channel 2 is concentric with a point 3, and the side 2'' is concentric with a corresponding point 3'. Moreover the distance between the points 3 and 3', i. e. the extreme width of the channel, is exactly equal to the distance between either of these points and the bottom or deepest point 4 of the channel. The cross sectional form of the channel bounded by the two sides thereof and the wall of the cylindric aperture within which the pin is inserted is accordingly triangular and equi-lateral, and the sides of this triangle bounded by arcs respectively concentric with the opposed angles thereof.

In conjunction with a pin constructed and channeled as described, I utilize a drawn bonding wire having this same cross sectional form and dimensions. That is to say, the cross sectional form of the bonding wire is triangular, equi-lateral and the sides thereof are formed on arcs respectively concentric with the opposed angles. The diametric dimensions of this wire are the same as those of the channel, so that when the wire is inserted through the opening in the rail and the bonding pin driven in alongside of the wire, the latter will occupy and exactly fill out and complement the pin so as to fill all parts of the rail aperture solidly full. By adopting this construction no care is required in assembling the bonding wire within the channel because it is immaterial which angle of the wire extends into the channel and it is impossible to assemble the parts otherwise than correctly. Furthermore, by using a bonding wire drawn to this cross sectional form throughout no care need be exercised in the matter of what distance the wire is inserted within or through the aperture of the rail and the bond can be instantly adjusted to any length desired or suitable for bridging the distance between the points of attachment to the two rails.

It will be noted that the degree of taper of the bonding pin is slight, and in practice the necessary taper is so slight that the slight difference between the arc of curvature of the smaller end of the pin and that of the larger end of the pin is negligible and ignored.

Some of the advantages of the present construction over one in which the bond is provided with specially formed grooved terminal portions and with shoulders limiting the insertion of such terminal portions in the rail are the following: The specially formed terminals are obviously expensive to manufacture. In actual practice the holes drilled in the rails are made as small as possible to admit of the proper attachment to the rail of a bonding wire of sufficient size to carry the desired current; the expense obviously increasing rapidly as the size of the hole is increased. A very small wedge can obviously not be well driven into place alongside of a bonding terminal in such manner as to exert as great a wedge pressure as could a larger wedge for the reason that the metal of the smaller wedge is not sufficient to withstand the driving blows. Moreover, it is obvious that a wedge forming the smaller part of the two members cannot be made to expand the terminal alongside of which it enters and cause the latter to fit the walls of the aperture with the same degree of perfectness as is the case where the wedging member is the larger member, chiefly surrounds the bonding wire and is itself the member which is driven in. Still further, where the bonding wire is embraced by the walls of the groove of the bonding pin, the two parts move together as the pin is forced home, and thus insure more accurate and perfect joints between all parts of the union, and it is the closeness of the joints which is the most important factor in making such a connection, not so much on account of the lessening of resistance and increasing of conductivity as on account of preventing access of air and moisture, and consequent oxidation and impairing of the union.

I claim as my invention:

1. A channeled bonding pin, exteriorly circular in cross-section, except for said channel, and provided with a longitudinal channel extending the full length of the pin and the sides whereof are formed respectively concentric with points co-incident with the juncture of the channel edges and outer surface of the pin, and the extreme width of said channel being equal to the distance between either of its edges and the deepest point of the channel.

2. A channeled bonding pin, exteriorly circular in cross-section, except for said channel, and provided with a longitudinal channel of substantially uniform depth throughout, the sides whereof are formed respectively concentric with points co-incident with the juncture of the channel edges and outer surface of the pin, and the extreme width of said channel being equal to the distance between either of its edges and the deepest point of the channel.

3. A rail bond mechanism, comprising a truncated-cone shaped pin, the taper whereof is of small degree throughout the main length thereof, provided in one side with an open channel extending the length of the pin and of substantially uniform depth and cross-sectional form throughout, and a bond wire drawn to a cross-sectional form and dimensions to accurately fit and fully occupy said channel, the outer side of said wire conforming in arc of curvature to the exterior of the pin and being substantially flush with the latter when arranged in said channel.

4. In combination, a rail bond pin exteriorly circular in cross-section, except for said channel, and provided with a longitudinal channel of substantially uniform depth throughout, the sides whereof are formed on arcs respectively concentric with points co-incident with the juncture of the channel edges and outer surface of the pin, and the extreme width of said channel being equal to the distance between either of its edges and the deepest point of the channel, and a bonding wire or rod having a pin-engaging portion of equi-lateral triangular form in cross-section, the several sides whereof are respectively formed on arcs concentric with the point of the angle opposed thereto, and the diametric dimensions of said pin-engaging portion being the same as those of the channel of the pin.

FREDERICK H. AYER.

Witnesses:
ALBERT H. GRAVES,
EMILIE ROSE.